(12) United States Patent
Bailey et al.

(10) Patent No.: US 9,317,514 B2
(45) Date of Patent: *Apr. 19, 2016

(54) SYNTHESIZED IDENTIFIERS FOR SYSTEM INFORMATION DATABASE

(71) Applicant: Infoblox Inc., Santa Clara, CA (US)

(72) Inventors: Stuart M. Bailey, San Jose, CA (US); Richard Kagan, San Jose, CA (US); Navin Boddu, Fremont, CA (US); David Vigier, Campbell, CA (US); Thomas S. Clark, Santa Cruz, CA (US); Joseph D. Head, Santa Clara, CA (US)

(73) Assignee: Infoblox Inc., Santa Clara, CA (US)

( * ) Notice: Subject to any disclaimer, the term of this patent is extended or adjusted under 35 U.S.C. 154(b) by 76 days.

This patent is subject to a terminal disclaimer.

(21) Appl. No.: 14/226,461

(22) Filed: Mar. 26, 2014

(65) Prior Publication Data

US 2014/0297643 A1   Oct. 2, 2014

Related U.S. Application Data

(63) Continuation of application No. 13/092,924, filed on Apr. 23, 2011, now Pat. No. 8,725,681.

(51) Int. Cl.
*G06F 17/30* (2006.01)
*H04L 29/12* (2006.01)

(52) U.S. Cl.
CPC .... *G06F 17/30091* (2013.01); *G06F 17/30598* (2013.01); *G06F 17/30958* (2013.01); *H04L 61/2069* (2013.01); *H04L 61/103* (2013.01); *H04L 61/2015* (2013.01)

(58) Field of Classification Search
CPC .............. G06F 17/30091; G06F 17/30958; G06F 17/20598; H04L 61/2069; H04L 61/103; H04L 61/2015
USPC ........................................................ 707/609
See application file for complete search history.

(56) References Cited

U.S. PATENT DOCUMENTS

| | | | | |
|---|---|---|---|---|
| 5,832,527 | A  * | 11/1998 | Kawaguchi | |
| 6,711,563 | B1 * | 3/2004 | Koskas | 707/769 |
| 7,613,703 | B2 * | 11/2009 | Kakivaya et al. | |
| 7,623,547 | B2 * | 11/2009 | Dooley et al. | 370/466 |
| 8,180,804 | B1 * | 5/2012 | Narayanan et al. | 707/798 |
| 8,185,558 | B1 * | 5/2012 | Narayanan et al. | 707/798 |
| 8,214,411 | B2 * | 7/2012 | Kahn et al. | 707/813 |
| 8,239,418 | B1 * | 8/2012 | Baluja et al. | 707/796 |
| 8,244,772 | B2 * | 8/2012 | Aasman et al. | 707/797 |

(Continued)

OTHER PUBLICATIONS

Chen et al., "Application Level Network Access Control System Based on TNC Architecture for Enterprise Network", International Conference on Wireless Communications, Networking and Information Security (WCNIS), pp. 667-671, IEEE, 2010.*

(Continued)

*Primary Examiner* — Phuong Thao Cao
(74) *Attorney, Agent, or Firm* — Van Pelt, Yi & James LLP (57) ABSTRACT

Techniques for managing system information are disclosed. In one embodiment, a piece of system information is received, a synthesized link is created linking a system information identifier corresponding to the system information to a synthesized group identifier, the synthesized group identifier represents a group to which the synthesized information/synthesized information identifier belongs.

66 Claims, 9 Drawing Sheets

(56) References Cited

U.S. PATENT DOCUMENTS

| | | | | |
|---|---|---|---|---|
| 8,290,991 | B2* | 10/2012 | Kahn | G06F 17/30997 707/687 |
| 8,291,468 | B1* | 10/2012 | Chickering | 726/1 |
| 8,572,129 | B1* | 10/2013 | Lee et al. | 707/798 |
| 8,725,681 | B1* | 5/2014 | Bailey et al. | 707/609 |
| 8,725,852 | B1* | 5/2014 | Boddu et al. | 709/221 |
| 2002/0035625 | A1* | 3/2002 | Tanaka | 709/223 |
| 2003/0034964 | A1* | 2/2003 | Yoshioka | 345/204 |
| 2004/0162855 | A1* | 8/2004 | Nagy et al. | 707/104.1 |
| 2005/0114385 | A1* | 5/2005 | Kim et al. | 707/102 |
| 2005/0216503 | A1* | 9/2005 | Charlot et al. | 707/103 R |
| 2006/0031772 | A1* | 2/2006 | Valeski | 715/751 |
| 2006/0074858 | A1* | 4/2006 | Etzold et al. | 707/3 |
| 2006/0194186 | A1* | 8/2006 | Nanda | 434/350 |
| 2006/0195778 | A1* | 8/2006 | Bendik | 715/500 |
| 2006/0272015 | A1* | 11/2006 | Frank et al. | 726/15 |
| 2007/0276918 | A1* | 11/2007 | Alderson | 709/217 |
| 2008/0133259 | A1* | 6/2008 | O'Connor et al. | 705/1 |
| 2008/0204243 | A1* | 8/2008 | Backes et al. | 340/572.1 |
| 2008/0225809 | A1* | 9/2008 | Guo | 370/338 |
| 2008/0243770 | A1* | 10/2008 | Aasman | 707/2 |
| 2008/0243799 | A1* | 10/2008 | Rozich et al. | 707/3 |
| 2008/0281801 | A1* | 11/2008 | Larson et al. | 707/4 |
| 2009/0204634 | A1* | 8/2009 | Yoshii | G06Q 30/02 |
| 2009/0271519 | A1* | 10/2009 | Helvick | 709/227 |
| 2010/0100768 | A1* | 4/2010 | Yamamoto et al. | 714/32 |
| 2010/0106709 | A1* | 4/2010 | Imai et al. | 707/713 |
| 2010/0296637 | A1* | 11/2010 | Shen et al. | 379/87 |
| 2010/0313264 | A1* | 12/2010 | Xie et al. | 726/22 |
| 2011/0029613 | A1* | 2/2011 | Hedditch | 709/205 |
| 2011/0106819 | A1* | 5/2011 | Brown et al. | 707/749 |
| 2011/0145206 | A1* | 6/2011 | Kahn | G06F 17/30348 707/690 |
| 2011/0145209 | A1* | 6/2011 | Kahn | G06F 17/30997 707/703 |
| 2011/0153854 | A1* | 6/2011 | Chickering | H04L 63/0815 709/229 |
| 2011/0182426 | A1* | 7/2011 | Roosta et al. | 380/255 |
| 2011/0196977 | A1* | 8/2011 | Lynch et al. | 709/229 |
| 2011/0246674 | A1* | 10/2011 | Ushiyama | 709/250 |
| 2012/0004003 | A1* | 1/2012 | Shaheen et al. | 455/509 |
| 2012/0022968 | A1* | 1/2012 | Manku | 705/26.41 |
| 2012/0054217 | A1* | 3/2012 | Clarke | 707/769 |
| 2012/0059861 | A1* | 3/2012 | Senjalia | 707/803 |
| 2012/0084422 | A1* | 4/2012 | Bandi et al. | 709/223 |
| 2012/0096043 | A1* | 4/2012 | Stevens, Jr. | 707/798 |
| 2012/0166961 | A1* | 6/2012 | Frazier | 715/738 |
| 2012/0173541 | A1* | 7/2012 | Venkataramani | 707/747 |
| 2012/0209886 | A1* | 8/2012 | Henderson | 707/798 |
| 2012/0254842 | A1* | 10/2012 | Henderson | 717/136 |
| 2013/0066745 | A1* | 3/2013 | de Heer et al. | 705/26.62 |

OTHER PUBLICATIONS

March et al., "Collision Detection and Resolution in Hierarchical Peer-to-Peer Systems", In Proceedings of the IEEE Conference on Local Computer Networks 30th Anniversary (LCN'05), 8 pages, 2005.*

J. Ursi, "IF-MAP Overview", Infoblox, 2009, 29 pages, accessed online at <http://www.itu.int/en/ITU-T/studygroups/com17/Documents/tutorials/2011/IFMAPOverview.pdf> on Aug. 4, 2015.*

Trusted Computer Group (TCG), "TCG Trusted Network Connect—TNC IF-MAP Binding for SOAP", published on May 18, 2009, 99 pages, accessed online at <http://www.trustedcomputinggroup.org/files/resource_files/51F74E9B-1D09-3519-AD2DAE1472A846/TNC_IFMAP_v1_1_r5.pdf> on Aug. 4, 2015.*

Infoblox White Paper, "IF-MAP and the Orchestration Era", Apr. 2010, 15 pages, accessed online at <http://www.if-map.org/sites/default/files/wp_if-map.pdf> on Aug. 4, 2015.*

* cited by examiner

SYNTHESIZED IDENTIFIERS FOR SYSTEM INFORMATION DATABASE

CROSS REFERENCE TO OTHER APPLICATIONS

This application is a continuation of U.S. patent application Ser. No. 13/092,924, now U.S. Pat. No. 8,725,681, entitled SYNTHESIZED IDENTIFIERS FOR SYSTEM INFORMATION DATABASE filed Apr. 23, 2011 which is incorporated herein by reference for all purposes.

BACKGROUND OF THE INVENTION

IF-MAP protocol is a standard client/server protocol for accessing metadata. In a typical Trusted Network Connect (TNC) environment, IF-MAP protocol serves as an interface between elements of Trusted Network Connect (TNC) architecture and a Metadata Access Point (MAP) (i.e. IF-MAP server). Trusted Network Connect (TNC) is an open architecture for Network Access Control promulgated by the Trusted Network Connect Work Group (TNC-WG). Metadata Access Point (MAP) is a TNC element that serves as an information clearinghouse for the TNC architecture. As a part of its function, IF-MAP server stores, correlates, and disseminates state information about net elements such as devices, users and flows in a network such as registered address bindings, authentication status, endpoint policy compliance status, endpoint behavior, and authorization status. IF-MAP uses a publish/subscribe model to collect information from all over the network and links them together to form a single searchable database. All net elements that access to the IF-MAP server (MAP Clients) may publish information to the MAP, search the information in the MAP, and subscribe to notification from the MAP when information stored in the MAP server changes. In addition to managing security related metadata in the TNC environment, IF-MAP can also be applied to manage other kinds of information or metadata, both within and outside of the TNC environment.

Figure 1:
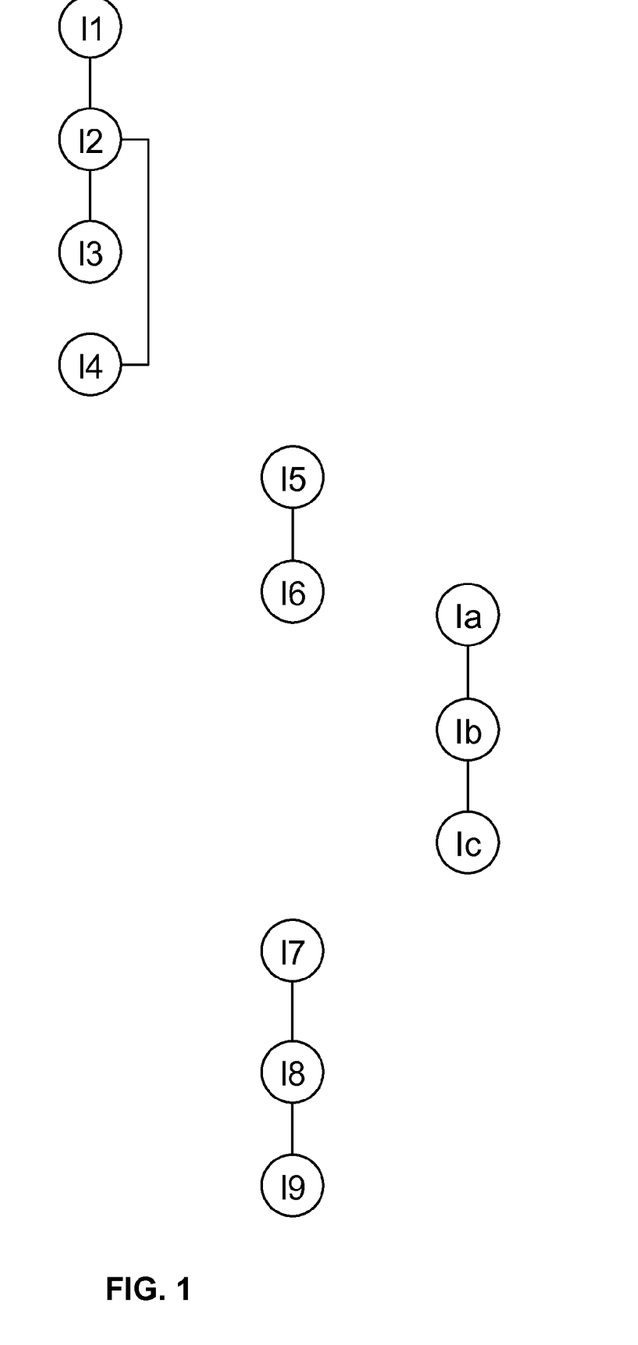
FIG. 1 is a block diagram illustrating a current IF-MAP database represented in a graph format.

FIG. 1 is a block diagram illustrating a current IF-MAP database represented in a graph format. The IF-MAP graph database comprises a set of IF-MAP identifiers (represented as circles), IF-MAP links (represented as lines), and associated metadata (not shown) that are represented as a graph of nodes and links. The actual information for the nodes, links and associated metadata are stored in an information management system or IMS. An IF-MAP identifier is a single, globally unique value within a space of values described by an identifier type specified in an IF-MAP schema. An IF-MAP link is typically a bi-directional binding relationship between two identifiers. IF-MAP metadata are data associated with identifiers or links and are represented as typed values. As shown here, identifiers are linked into disconnected groups (shown here as Group I: I1, I2, I3, and I4; Group II: I5, I6; Group III: I7, I8, I9; Group IV: Ia, Ib, Ic).

Current implementations of IF-MAP servers including Infoblox IBOS require IF-MAP clients to have prior knowledge of specific Identifiers (such a specific IP Address or MAC address) on which subscriptions and searches are defined or based. Queries for carrying out search or subscription operation must include a specific identifier as a starting point. This requirement is a limitation of current specification of IF-MAP and restricts IF-MAP servers from being providers of information for several use cases. Discovery of devices is one such use case where IF-MAP servers need to update subscriptions with results of newly published metadata and associated Identifiers to IF-MAP clients. MAP servers' requirement of prior knowledge of specific starting point identifiers also limits the search capabilities for IF-MAP servers, since if no specific identifier is known, search and subscription cannot be carried out, and in addition, search and subscription currently cannot easily bridge the gap between different groups of identifiers that are not linked together directly or indirectly. For example to retrieve metadata associated with I1, the search and subscription must start from I1 or an identifier directly or indirectly linked to I1 (e.g., I2, I3, or I4), search and subscription cannot start from a node not directly or indirectly linked to I1 (e.g., I5, I6, I7, I8, I9, Ia, Ib, or Ic). As such the entire graph database cannot be easily searched even if a specific starting identifier is known to a client.

Thus an improved method for managing data stored on IF-MAP server is needed.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques for managing system information in a database are disclosed. The system information can potentially include any information relating to a physical and logical entity of a system (e.g., network environment) such as information relating to users, identities, applications, processes, and devices of a system. Although IF-MAP database is used as an example for illustrative purposes, the techniques described herein can also be applied to other databases.

In various embodiments, a piece of system information is received. In response, a corresponding system information identifier representing the system information is identified, selected or generated. A synthesized link is created to link the system information identifier to a synthesized group identifier.

The synthesized group identifier is a logical identifier representing a logical group to which the system information or the system information identifier belongs. It is a dummy identifier created for managing the database such as providing searching and subscription services. For example, the synthesized group identifier may be a synthesized IPAddressSpace identifier representing all IP address of a network environment in a database, a MACAddressSpace identifier representing all MAC address of a network environment in a database, a DeviceSpace identifier representing all devices of a network environment, an IdentitySpace identifier representing all devices of a network environment, an AccessRequestSpace identifier representing all access requests of a network environment, a DomainSpace identifier representing a particular domain in a network environment. In various embodiments, the synthesized group identifier is a non-root synthesized identifier, the non-root synthesized identifier can be linked to a root synthesized identifier, the highest level synthesized group identifier representing all identifiers stored in a database. In various embodiments, the synthesized group identifier is a synthesized root identifier. In various embodiments, the synthesized root identifier is a unique root identifier linked to all identifiers of the database. In various embodiments, the synthesized root identifier is a non-unique root identifier. In various embodiments, the synthesized root identifier can be linked to a plurality of lower level synthesized non-root group identifiers each representing a logical group of system information identifiers.

Various suitable ways can be employed create the synthesized link linking the system information identifier to the synthesized group identifier. In various embodiments, creating the synthesized link includes making an entry in a table linking the network information identifier to the synthesized group identifier. In various embodiments, creating the synthesized link includes generating a query link linking the system information identifier to the synthesized group identifier. Various other ways of linking the system information identifier to the synthesized group identifier can also be used. The synthesized link is subsequently stored, for example in the database. In various embodiments, a search or subscription request is received from a client and in response to the search or subscription request, the synthesized link is traversed to provide a search result (e.g., identifiers, links, and associated identifiers) to the client. In various embodiments, the synthesized link is a unidirectional link that can only be traversed in one direction, from the synthesized group identifier to the received system information identifier. In various embodiments, the synthesized link is a bi-directional link that can be traversed from the synthesized group identifier to the received system information identifier or the other way around.

Grouping system information identifiers into logical groups and creating synthesized links linking each of the system information identifiers to a synthesized group identifier provides a mechanism to overcome the above described limitations of the current IF-MAP servers. For example, a synthesized group identifier serves as bridging point linking all system information identifiers of a group of identifiers represented by the synthesized group identifier. As a result, any point (e.g. node, link, metadata) within the group of linked system identifiers can be used as a reference or starting point for search/subscription definitions to reach any other point within the group of linked system identifiers. In addition, the synthesized group identifier can itself be used as a reference or starting point for search/subscription definitions to reach any point within the group of system information identifier, as a result an IF-MAP server can search or get updates via subscription without the client having to know a specific system information identifier.

If the synthesized group identifier is a root identifier or linked into a root identifier, search/subscription based on a synthesized group identifier can reach any point in the entire network of system information identifiers in the database. In addition, any point within the entire network system information identifiers can be used as a reference or starting point for search/subscription definitions to reach any other point in the entire network of system information identifiers.

In addition, the synthesized group identifier can be used in the search/subscription definition to allow the entire group of system identifiers represented by the synthesized group identifier to be searched without prior knowledge of any specific system information identifier, link, or associated metadata. If the synthesized group identifier is a root identifier or linked to a root identifier, the entire database can potentially be searched without prior knowledge of any specific identifier, link, or associated metadata. In various embodiments, a search/subscription can be automatically converted to a search/subscription based on a synthesized group identifier, for example when the initial search/subscription definition does not yield valid search result, or when the initial search/subscription definition is not a valid search/subscription definition.

Further linking a system information identifier to a synthesized group identifier to which the system information identifier belongs at the time when the system information is received potentially saves computation and storage resources since one does not have to link all potential system information identifiers to the synthesized group identifiers to which they belong and linking is established only when it is necessary.

Figure 2:
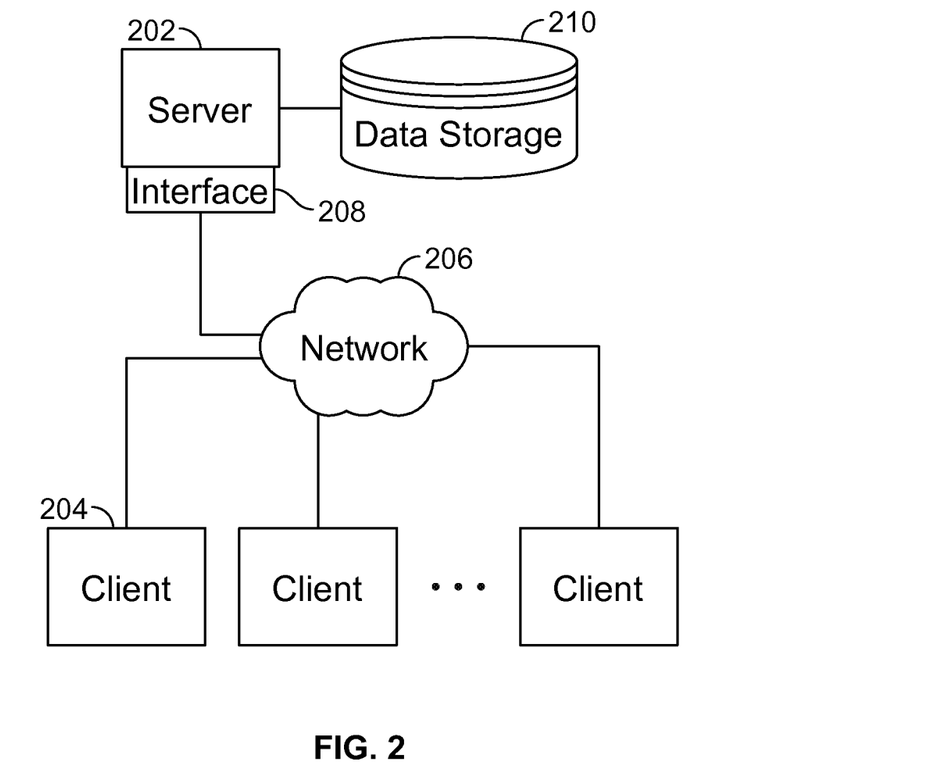
FIG. 2 is a block diagram illustrating a system information management system for managing system information in accordance with various embodiments.

FIG. 2 is a block diagram illustrating a system information management system for managing system information in accordance with various embodiments. In the example shown, the system information management system is a network information management system for managing network information of a network environment. The network information management system shown here includes a server 202 and a plurality of clients 204 connected to the server 202 via a data network 206. The server 202 can be a centralized server or a distributed computing environment serving the function of the server. Clients 204 can be any network element accessing the server, by communicating information to and/or retrieving information from the server 202. Example clients include various other elements of a TNC architecture, devices, users, applications, and/or processes on the network. In various embodiments, server 202 is an IF-MAP server that performs the IF-MAP function of the TNC architecture and clients 204 are IF-MAP clients. The clients 204 can communicate network information to the server 202, can search and/or subscribe to publication notification of the type information stored on the server 202. The server 202 additionally includes a communication interface 208 for communicating with the clients 204, a processor (not shown) for receiving, processing, correlating and disseminating up to date system information, and associated data storage 210 for storing network information such as various system information identifiers, links and associated metadata. In various embodiments, the system information is stored in a graph database, such as an IF-MAP graph database, in the data storage 210. The data storage 210 can also store other information such as computer instructions, rules, policies that can be used by the server to manage network information in accordance with various embodiments.

Figure 3:
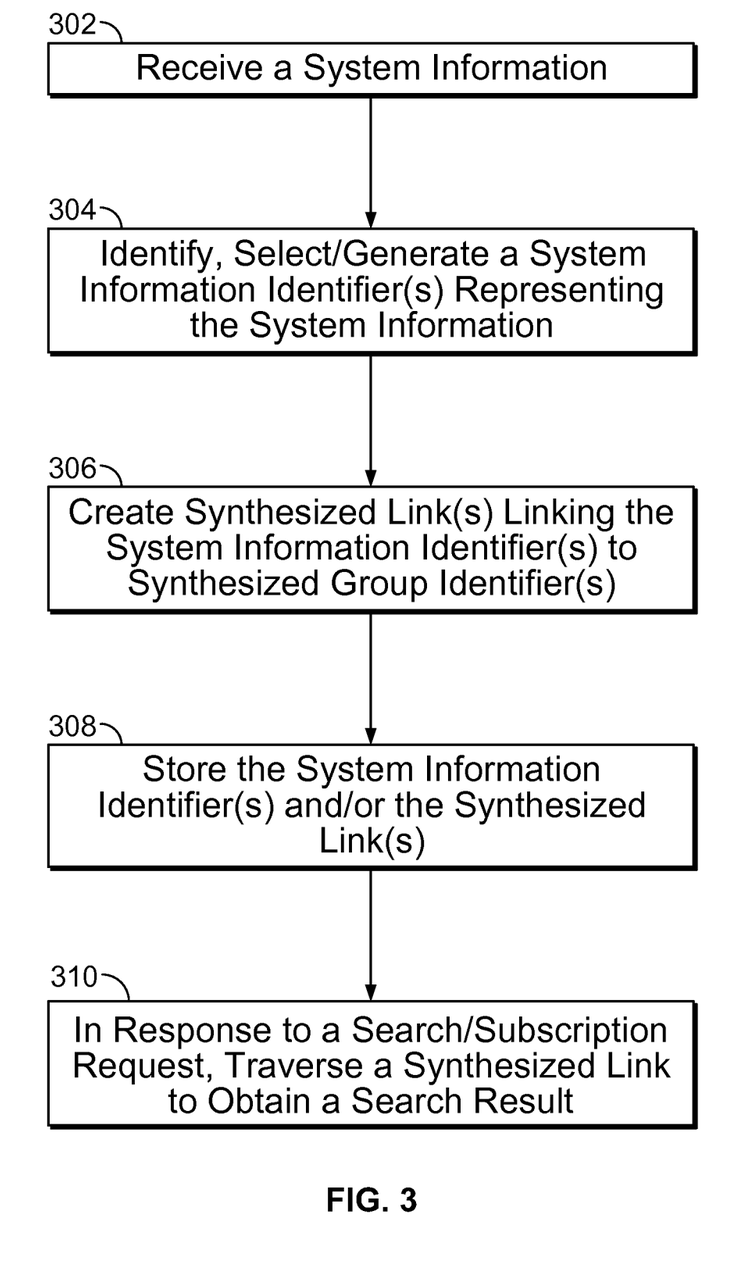
FIG. 3 is a block diagram illustrating an example process for managing system information in accordance with some embodiments.

FIG. 3 is a block diagram illustrating an example process for managing system information in accordance with some embodiments. In the example, network information is shown as an example of system information being managed. The process may be implemented by a server for managing system information.

At 302, a piece of system information is received. The system information may be a piece of information relating to a physical or logical entity of the system such as information relating to users, accounts, applications, operations, identity, computing node, processes, devices and other physical or logical entity of a system. In one example, the system information received is a DHCP lease information containing various pieces of system information including an IP address to MAC address association and other information relating to the DHCP lease such as lease time period. In various embodiments, the system information can be received from a client such as an IF-MAP client or received from a server such as another IF-MAP server.

At 304, one or more appropriate system information identifiers are identified, selected, or generated based on the received system information. In various embodiments, the appropriate system information identifiers already exist in the database and only needed to be identified or selected from a plurality of system information identifiers present in the database. In various embodiments, one or more appropriate system information identifiers need to be generated. In one example, an IP address and MAC address are identified, selected, or generated based on the received system information. In various embodiments, corresponding metadata associated with the system information identifier(s) are saved. In various embodiments, the system information identifiers are linked to other system information identifiers of the database.

In various embodiments, the system information identifier is a single, globally unique value within a space of values described by an identifier type and is used to uniquely identify the system information in a network environment. Example system information identifiers include IP address, MAC address, identity (user) identifier, session identifier, device identifier, etc. The identifier may be associated with one or more items of metadata which may be represented as system values. The associated metadata can also be received together with the identifier. In various embodiments, the identifier is published by a client such as a MAP client and the identifier is received at a server such as an IF-MAP server. In various embodiments, metadata associated with the identifier is published by a client such as a MAP client and the identifier is instantiated from the published metadata. In one example, the received system information is a DHCP lease information and an IP address identifier and MAC address identifier are identified, selected/generated based on the received DHCP lease information, particularly based on the IP address-MAC address association obtained from the DHCP lease information.

At 306, synthesized link(s) are created to link the system information identifier(s) to synthesized group identifier(s). The synthesized group identifier is a logical identifier that uniquely identifies or represents a logical group to which the system information identifier belongs. In various embodiments, the synthesized group identifier is linked to all network information identifier instances received that belong to the logical group. For example, the synthesized group identifier can be a synthesized group identifier that represents the entire IP address space of a network environment in a database and all IP address identifiers of the network environment received in the database are linked to the synthesized group identifier. A search/subscription operation defined based on the synthesized group identifier can potentially reach all identifiers of the logical group. In various embodiments, the synthesized group identifier is automatically created based on predefined rules in response to receiving the network information identifier. In various embodiments, the synthesized group identifier is user specified and generated via manual instruction by a user. For example, a synthesized publisher identifier can be created for a publisher having a specific Publisher ID and any network information identifiers associated with the publisher (e.g., includes the publisher ID) is linked to the synthesized publisher identifier. In various embodiments, the synthesized group identifier is automatically selected from a plurality of synthesized group identifiers using a processor based on predefined rule(s) for linking to the received network information identifier.

In various embodiments, the synthesized group identifier is a synthesized root identifier representing all identifiers of a MAP. In various embodiments, the logical group can be thought of as including all identifiers of the MAP. The synthesized root identifier is the highest level synthesized group identifier, a master synthesized group identifier to which all other identifiers (e.g. synthesized group identifier, received system information identifier) of the database are linked In various embodiments, the logical A search/subscription operation defined based on the synthesized root identifier can always reach all identifiers of the database In various embodiments, only a single synthesized root identifier is created while a plurality of non-root synthesized group identifiers can be created for a given database for storing network information identifiers and associated metadata and links. Each of the plurality of non-root synthesized group identifiers represents one of a plurality of logical groups of network information identifiers of the database. The membership of the plurality of logical groups may overlap in some instances. For example, all IP addresses of a network environment can be grouped into a single IP address space, represented by a single unique synthesized IP address identifier. All MAC addresses of a network environment can be grouped into a single MAC address space, represented by a single unique synthesized MAC address identifier. All IP address and MAC address of a DHCP IP address-MAC address association are linked to a synthesized DHCP identifier representing all DHCP associations. All IP addresses of an entity (e.g., company, an administrative domain) can be grouped into a logical group and represented by a unique synthesized entity identifier. The membership the DHCP association overlaps with that of the IP address space and MAC address space. The membership of the IP address space may overlap with that of the entity.

In various embodiments, the synthesized link is a unidirectional link that can only be traversed in one direction, such as from the synthesized group identifier to the network information identifier, not the other way around. In various embodiments, the synthesized link is a bidirectional link that can be traversed in either direction if needed. In various embodiments, the synthesized group identifier can be further linked to one or more additional synthesized group identifiers, such as synthesized non-root identifiers and/or a synthesized root identifier. In one example, a network information identifier is linked to a synthesized non-root identifier which is linked to a synthesized root identifier.

In one particular example, the system information received is a DHCP lease, a corresponding IP address identifier corresponding to the DHCP lease is linked to a synthesized IP address identifier representing all IP address of the database and a corresponding MAC address identifier is linked to a synthesized MAC address identifier representing all MAC address of the database. The synthesized IP address identifier and the synthesized MAC address identifier are linked to a root identifier of the database.

At 308, the system information identifier(s) and/or the synthesized link(s) are stored. In various embodiments, storing includes storing associated metadata with the corresponding identifier(s) or link(s). In various embodiments, the identifier(s and the associated metadata are stored in a flat-file. In various embodiments, the information is stored in a flat-file. In various embodiments, the information is stored in a database such as a graph database that includes a set of graphically represented nodes (representing identifiers) and associated edges (representing links). The identifiers and associated metadata and the relationship between the identifiers (links) of the graph database can be stored as various tables in a relational database such as a DBMS database. In one example, the network information identifier and the synthesized link are stored in an IF-MAP graph database that serves as a clearinghouse for gathering, correlating, and disseminating state information for various elements in a TNC network environment.

In various embodiments, the method further includes the step(s):

At 310, in response to a search or subscription request, the synthesized link is traversed to produce a search result. In various embodiments, the search/subscription request is defined based on a synthesized group identifier, all items represented by the synthesized group identifier can be searched by the search/subscription request. If the synthesized group identifier is a root identifier or is linked to a root identifier, the entire database can also be searched based on the search/subscription request. In various embodiments, the search/subscription request is defined based on a particular node (e.g., system information identifier), link (e.g., link between one system information identifier to another system information identifier) or associated metadata, the search/subscription can be converted to a search/subscription request based on a synthesized group identifier automatically. In various embodiments, the search/subscription is based on a invalid search starting point, the search/subscription can be automatically converted to a search based on a synthesized group identifier. In various embodiments, the search/subscription request is defined based on a particular node (e.g., system information identifier), link (e.g., link between one system information identifier to another system information identifier) or associated metadata, the search/subscription can lead to traversing a synthesized link linking a synthesized group identifier to a system information identifier.

The search/subscription operation may be a hierarchical search that includes the synthesized group identifier as a reference or starting point and may include a set of matching criteria such as link/identifier matching criteria, search depth, maximum search size, and/or search result filter. In various embodiments, the search/subscription request is expressed in an interrogation language such as SQL language. In various embodiments, the search/subscription request is expressed in a standard protocol language such as IF-MAP. In various embodiments, the search/subscription request is expressed using a pattern-match or regular expression search. The search/subscription operation traverses links connected to the synthesized group identifier, including one or more paths that start from the synthesized link linking the synthesized group identifier to the identifier associated with received system information, followed by a series of links and nodes downstream of the synthesized link. In various embodiments, the retrieval model is that of an ever-widening search of the graph of the graph database by examining and rule matching metadata associated with identifiers and links in various paths leading from that of the synthesized group identifier to the received network information identifier. The search result may include relevant identifiers, links, and associated metadata.

In various embodiments, the search/subscription request is defined based on a synthesized non-root identifier representing a logical group network information identifiers. Since all system information identifiers in the logical group are linked to the synthesized non-root identifier, all system information identifiers in the logical group can be reached or examined by the search/subscription operation specified by the search/subscription request. System information identifiers that are not in the logical group and are not linked to the synthesized non-root identifier will not be reached by the search/subscription request. In various embodiments, non-root synthesized group identifiers may exist without links to a root synthesized group identifier (i.e. there may not be a hierarchy with a root and subordinate non-root synthesized group identifiers).

In various embodiments, the search/subscription request is defined based on a synthesized root identifier. Since all network information identifiers in the database are linked to the synthesized root identifier, the search/subscription operation can potentially reach all network information identifiers of the database, provided they are linked to the synthesized root identifier.

In various embodiments, the search/subscription request does not include a reference to a synthesized non-root identifier or the synthesized root identifier, the process may automatically apply a search/subscription operation based on the synthesized root identifier. In this way, even if the client is not aware of any synthesized group identifier, search/subscription operation can still be carried out to reach all network information stored in the database, albeit more expensive since the entire database is searched.

In various embodiments, the search or subscription request is received from a client such as a MAP client and the search result is communicated back to the requesting client.

Figure 4:
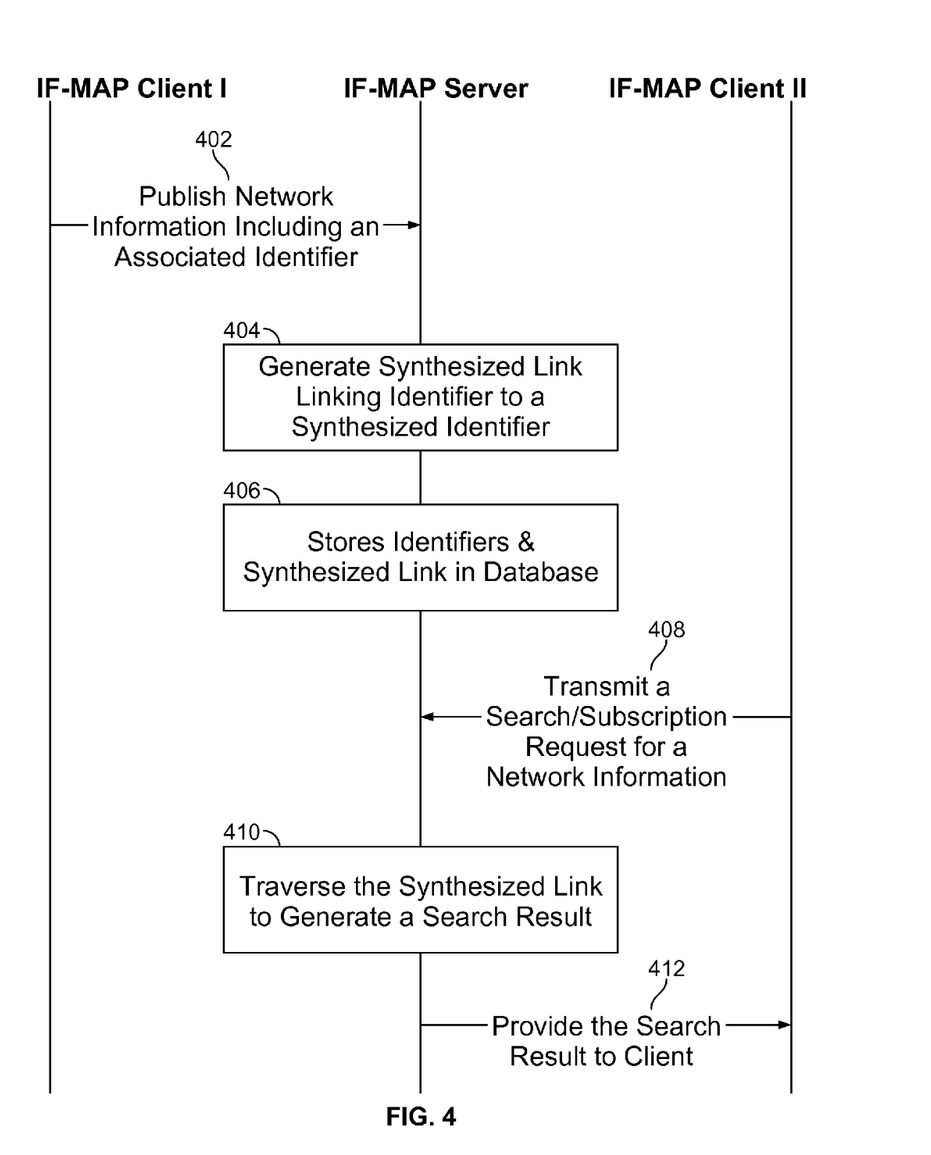
FIG. 4 is a block diagram illustrating an example process implemented by IF-MAP client/server for managing system information in accordance with some embodiments.

FIG. 4 is a block diagram illustrating an example process implemented by IF-MAP client/server for managing system information in accordance with some embodiments.

At 402, an IF-MAP client (IF-MAP Client I) publishes a system information including associated identifiers. More particularly in this example, the DHCP server publishes a DHCP lease, the DHCP lease includes a set of configuration parameters that includes an association of an IP address with a client device identifier. In this example, the client device identifier is a MAC address, in other instances the DHCP lease may includes other client device identifiers such as DUID (DHCPv6 Unique Identifier)).

At 404, the IF-MAP server receives the system information and the associated system information identifier(s) and in response the received identifiers (e.g., IP address and MAC address), the IF-MAP server generates a standard IF-MAP link (in this example bidirectional link) linking the IP address to the MAC address in the IF-MAP database. In addition, the IF-MAP server also generates one or more synthesized link(s) linking the received system information identifiers to appropriate synthesized group identifiers. The system information can be received via various means. In various embodiments, the system information is published by an IF-MAP client. In various embodiments, the IF-MAP server receives the system information via subscription from another server such as another IF-MAP server. In various embodiments, the synthesized group identifiers already exist in the IF-MAP database. The synthesized group identifiers may have been generated previously, for example manually by a system administrator, automatically based on user specification, system information received. If the synthesized group identifiers already exist in the IF-MAP database, the process automatically selects the appropriate synthesized group identifiers for linking with the received network identifiers. If the synthesized group identifiers do not yet exist in the IF-MAP database, the IF-MAP server may in response generate appropriate synthesized group identifiers, either automatically based on a set of rules and without user instructions, or based on user specification. The user may specify the name, the logical group represented by, rules and policies for linking network information identifiers to, and other attributes associated with the synthesized group identifier.

In this example, the synthesized IPAddressSpace identifier, the synthesized MACAddressSpace identifier, and the DHCPAssociationSpace identifier already exist in the IF-MAP server, the IF-MAP server simply selects the appropriate synthesized group identifier(s) from a plurality of existing synthesized group identifiers to link the received IP address and MAC address based on the system information identifiers received. The IF-MAP server creates a synthesized link linking the IP address to the synthesized IPAddressSpace identifier representing the entire IP address space of the database, and creates a synthesized link linking the MAC address to a synthesized MACAddressSpace identifier representing the entire MAC address space of the database, and creates a synthesized link linking the IP address and the MAC address to the synthesized DHCPAssociationSpace identifier representing the entire DHCP association space of the database. The synthesized IPAddressSpace identifier, the synthesized MACAddressSpace identifier and the synthesized DHCPAssociationSpace identifier are in turn linked to a synthesized root identifier. In this example, the DHCP lease also includes a publisher ID identifying the DHCP server (DHCP Server A) publishing the DHCP lease, in response the IF-MAP server can also generate a synthesized group identifier (synthesized DHCP-A identifier) representing DHCP server A based on the received publisher ID, and further generate a synthesized link linking the IP address and MAC address to the synthesized DHCP-A identifier.

At 408, the IF-MAP server stores the received IP address, MAC address, Publisher ID, IF-MAP links linking the IP address to the MAC address, the synthesized group identifiers, the synthesized links, and the associated metadata in the IF-MAP graph database in a set of lists and tables of the IF-MAP database. The information stored in the tables and lists can be represented as a graph.

At 410, an IF-MAP client, in this case IF-MAP Client II which can also be any net element accessing the IF-MAP server, submits a search or subscription request based on the synthesized group identifier (in this case the IPAddressSpace synthesized group identifier) to the IF-MAP server. At 412, the IF-MAP server traverses all the synthesized links linking the synthesized group identifier (in this example the IPAddressSpace synthesized group identifier) to a plurality of system information identifiers (in this example IP addresses) and examines all the paths leading from the plurality of synthesized links to generate a search result. At 414, the search result is provided to the client. In this example, the search result may include identifiers, links, and associated metadata.

Figure 5:
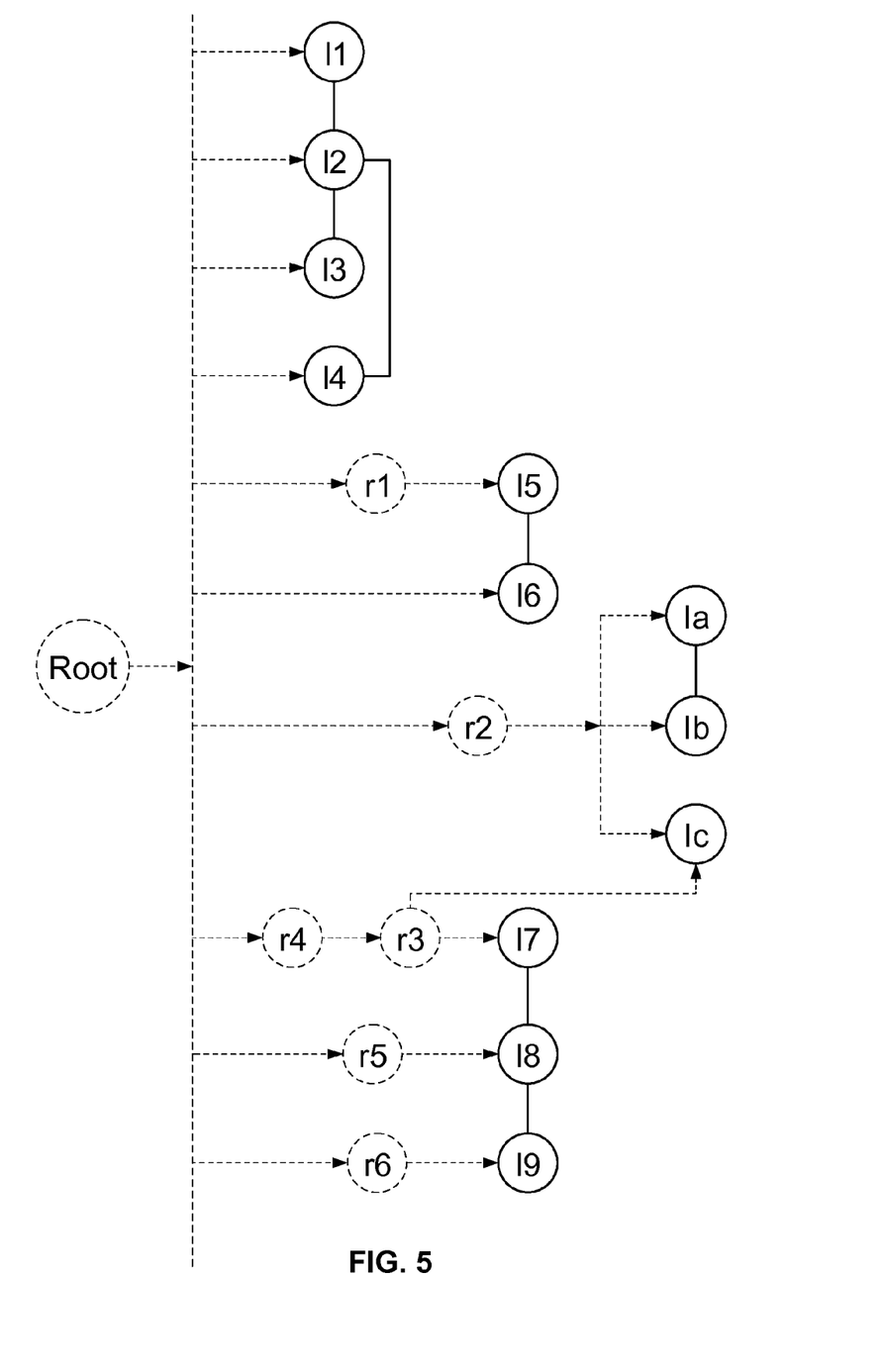
FIG. 5 is a block diagram illustrating an example database that can be used to manage network information in accordance with various embodiments.

FIG. 5 is a block diagram illustrating an example database that can be used to manage network information in accordance with various embodiments. The example database shown here is an IF-MAP graph database, which includes a plurality of IF-MAP identifiers (system information identifiers represented by solid circles) and associated IF-MAP links (linking two IF-MAP identifiers and is represented by solid lines) linking IF-MAP identifiers defined by prior versions of the IF-MAP protocol standard. It should be noted that although an IF-MAP graph database is shown in this example, in various other embodiments, other types of database can also be used. In addition, the IF-MAP graph database also includes synthesized group identifiers (represented by dashed circles) and synthesized links (represented by dashed lines) that are not defined in the IF-MAP protocol. The IF-MAP links shown here are bidirectional links while the synthesized links are unidirectional links linking network information identifiers to the synthesized group identifiers. The synthesized links in this example can only be traversed in one direction, from synthesized group identifiers to the network information identifiers. For example, I5 is linked to r1, when the I5-to-r1 link can only be traversed from the r1 to I5.

The IF-MAP identifiers and IF-MAP links are defined in the IF-MAP protocol. Each of the IF-MAP identifiers uniquely identifies a system information in an environment, such as end-user, device, application, process (e.g., operation, query), identity, address (e.g., IP address, MAC address), and logical and physical entity. The IF-MAP identifiers can be standard IF-MAP identifiers or customer defined IF-MAP identifiers. The IF-MAP identifiers and links are "real" identifiers and links that have meaning outside the IF-MAP and/or TNC. The IF-MAP identifiers and links are known and shared by various elements outside of the IF-MAP.

In various embodiments, the synthesized group identifiers and links are not "real" identifiers or links in the sense that they are created within the IF-MAP server and do not represent actual system information (e.g., identity and association) in an environment. In various embodiments, they do not have any function outside of the IF-MAP server and are generally not known or used by an IF-MAP client or other elements of the environment except for search/subscription of data stored in the IF-MAP server.

In various embodiments, the synthesized group identifiers the synthesized group identifiers represent actual system information in an environment. For example, a network synthesized group identifier to which all IPs in a network are bound can be created.

In various embodiments, clients may be informed of the synthesized group identifiers so they can make appropriate search and subscription requests. In various embodiments, the IF-MAP server may take queries based on IF-MAP identifiers into queries queries based on synthesized group identifiers.

The synthesized group identifiers shown include a single synthesized root identifier (represented by "R") and a plurality of synthesized non-root identifier (r1, r2, 43, r4, r5, r6). All identifiers, including all IF-MAP identifiers and synthesized non-root identifiers, are linked to the synthesized root identifier, directly or indirectly via other identifiers. A search or subscription based on the root identifier can potentially reach all identifiers, links and associated metadata in the IF-MAP database. Each of the plurality of synthesized non-root identifiers represent a logical group and all identifiers belonging to the logical group are linked to the synthesized non-root identifier since they are all linked to the synthesized group identifier. A search or subscription based on the synthesized non-root identifier can potentially reach all identifiers, links and associated metadata of the logical group.

The IF-MAP database shown includes some identifiers (I1, I2, I3, I4, I6) that are linked directly to the synthesized root identifier (R), some identifiers that are linked to a synthesized non-root identifier (I5, Ia, Ib, Ic, I8, I9), some identifiers (Ic) that are linked to two synthesized non-root identifiers (r2, r3) that each represent a separate logical group, some identifiers that are linked to the synthesized root identifier (R) via two non-root identifiers.

Figure 6:
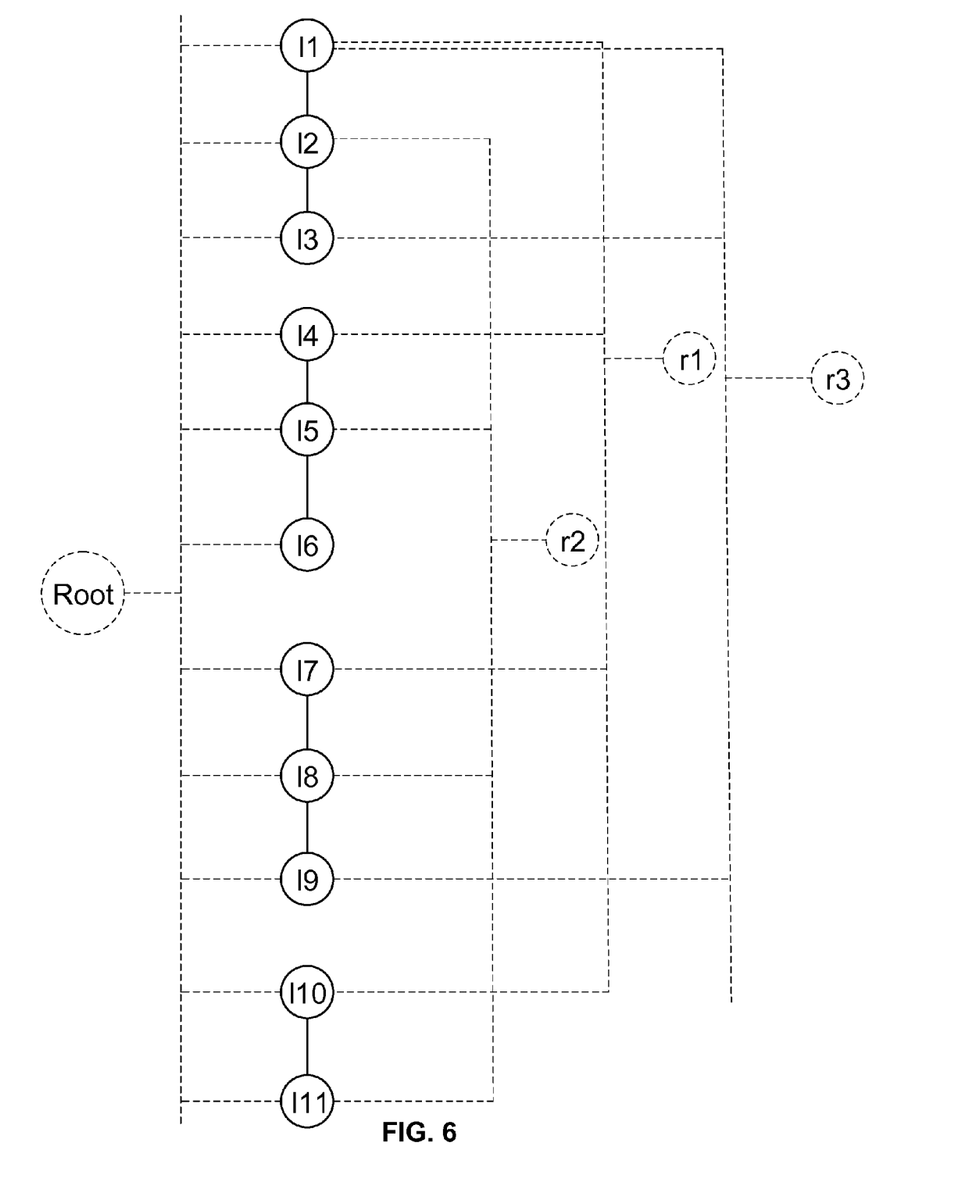
FIG. 6 is a block diagram illustrating an example database that can be used to manage network information in accordance with various embodiments.

FIG. 6 is a block diagram illustrating an example database that can be used to manage network information in accordance with various embodiments. The example database shown here is an IF-MAP graph database, which includes a plurality of IF-MAP identifiers (as system information identifiers and represented by solid circles) and associated IF-MAP links (represented by solid lines) linking IF-MAP identifiers defined by prior versions of the IF-MAP protocol standard. In addition, the IF-MAP graph database also includes synthesized group identifiers (represented by dashed circles) and synthesized links (represented by dashed lines) that are not defined in the IF-MAP protocol. The IF-MAP links shown here and the synthesized links are bidirectional links that can be traversed in either direction. In the example shown, all IF-MAP identifiers (as system information identifiers) are linked directly to a root identifier and linked to their corresponding synthesized sub-group/group identifiers. However, the synthesized sub-group/group identifiers are not linked to the root identifier. Although only one root identifier is shown, it is possible to have multiple root identifiers each of which is linked to all IF-MAP identifiers (defined by prior version of IF-MAP and are the system information identifiers). Furthermore, a single IF-MAP identifier can be linked to multiple synthesized group identifiers representing different groups the IF-MAP identifier belongs. For example, an IP address identifier can be linked to an IPAddressSpace group identifier representing all IP addresses of a network environment, it can also be linked to a specific DeviceAddressSpace group identifier representing all devices of a network environment since the IP address is for a device, and it can further be linked to a DomainSpace group identifier representing a particular domain in a network environment since the IP address belongs to a particular domain.

Figure 7:
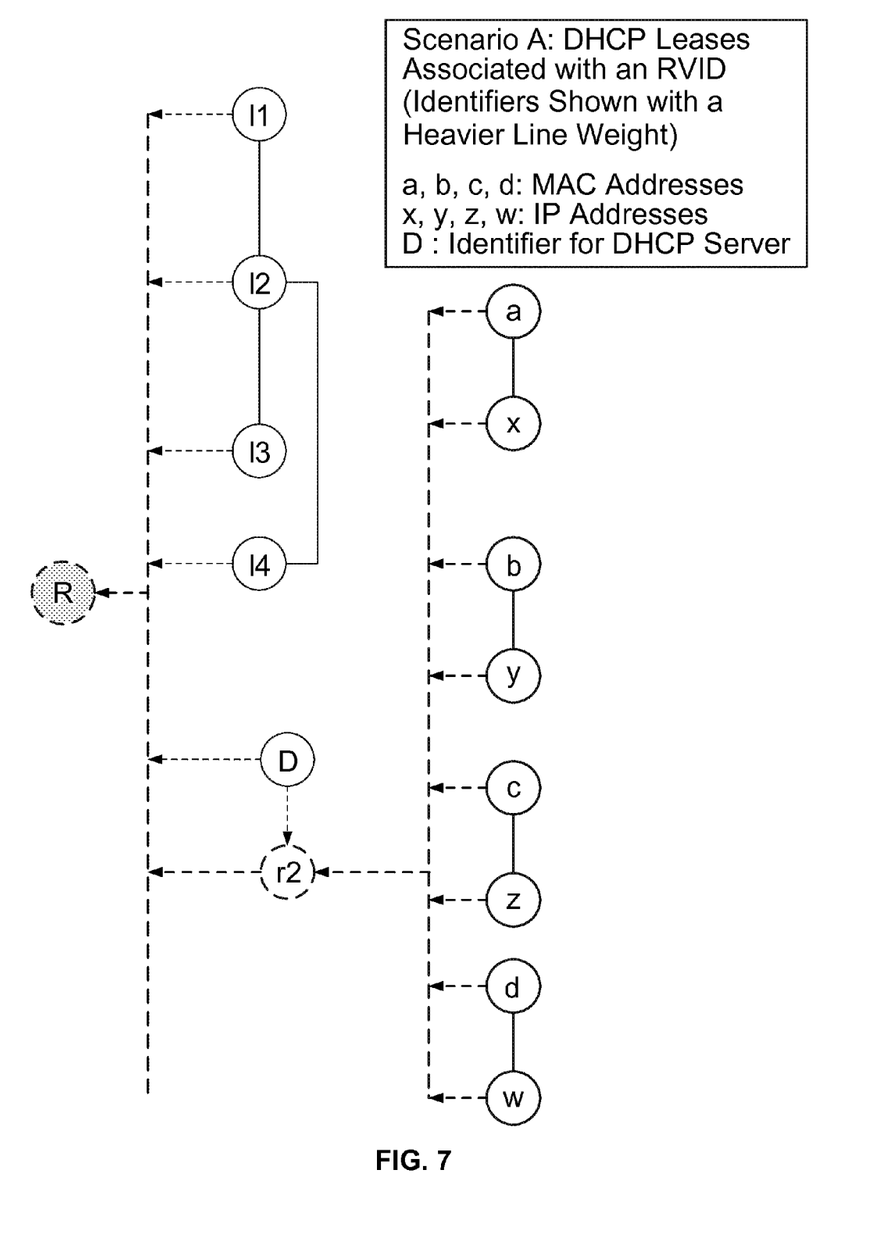
FIG. 7 is a diagram illustrating linking system information identifiers corresponding to a DHCP lease to synthesized group identifiers in an IF-MAP database.

FIG. 7 is a diagram illustrating linking system information identifiers corresponding to a DHCP lease to synthesized group identifiers in an IF-MAP database. The IF-MAP identifiers are represented by solid circles, the IF-MAP links are represented by solid lines, the synthesized group identifiers are represented by dashed circles and the synthesized links are represented by dashed lines. The synthesized group identifiers include a root identifier (R) and synthesized non-root identifier (r). This example shows linking of IP addresses (x, y, z, w) and device identifiers (a, b, c, d) associated by a DHCP lease to a synthesized DHCPAssociationSpace identifier (r2). Example device identifiers include MAC addresses and DUID addresses. This example also shows a DHCP server identifier (D) of the DHCP server assigning the IP-MAC associations linked to the synthesized DHCPAssociationSpace identifier (r2). All identifiers are linked to the synthesized root identifier directly or indirectly. The IF-MAP links are bidirectional links that can be traversed in either direction while the synthesized links are unidirectional links that can be traversed in the reverse direction (represented by arrow) of the link.

Figure 8:
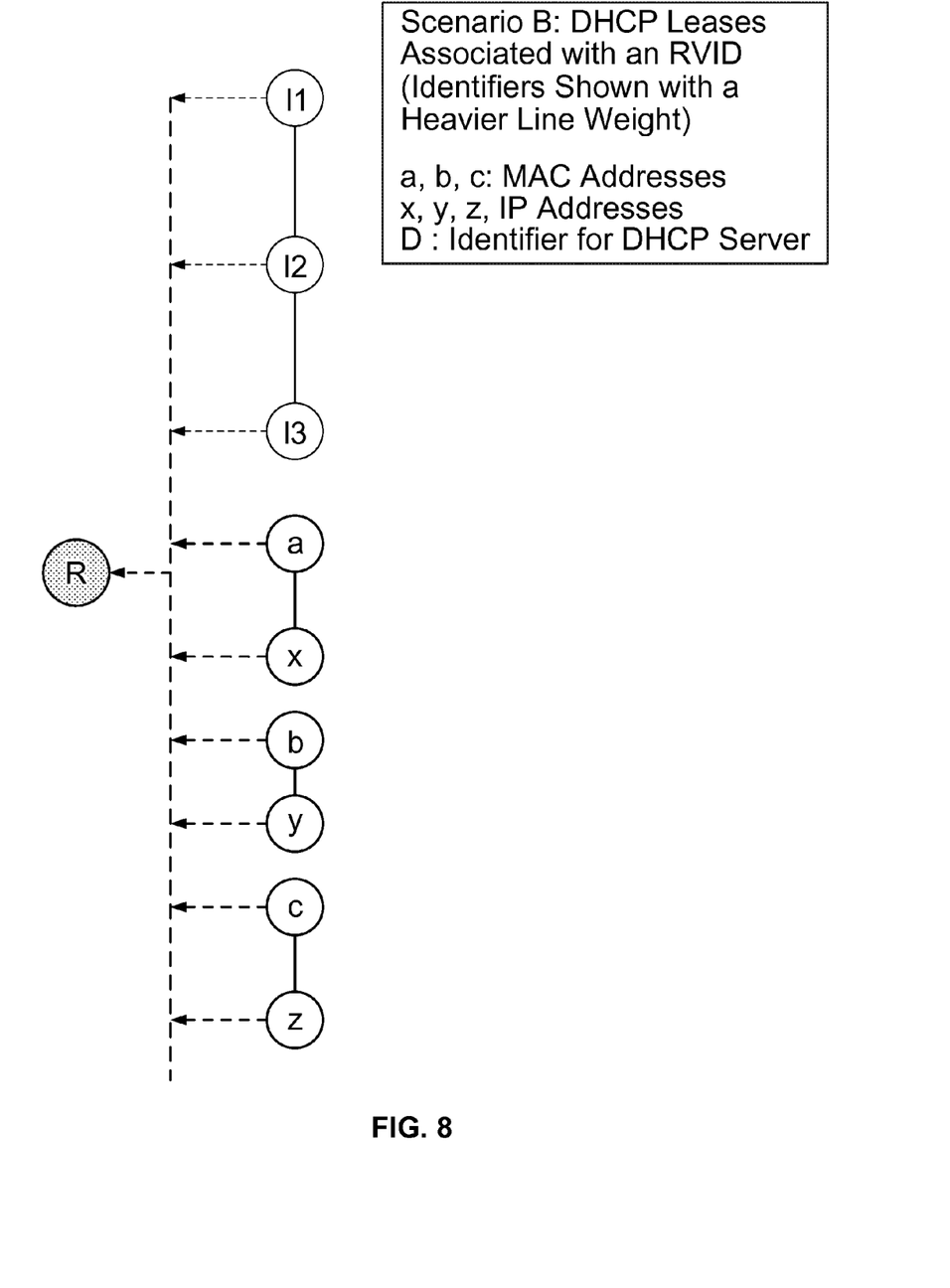
FIG. 8 is a diagram illustrating linking system information identifiers corresponding to DHCP leases to synthesized group identifiers in an IF-MAP database.

FIG. 8 is a diagram illustrating linking system information identifiers corresponding to DHCP leases to synthesized group identifiers in an IF-MAP database. The IF-MAP identifiers are represented by solid circles, the IF-MAP links are represented by solid lines, the synthesized group identifiers are represented by dashed circles and the synthesized links are represented by dashed lines. In this example, DHCP associated IP address and device identifier are linked via a IF-MAP bidirectional link. All IP addresses (x, y, z, w) and device identifiers (a, b, c, d) associated by DHCP leases are directly to the synthesized root identifier (R). Example device identifiers include MAC addresses and DUID addresses. As such, a search based on the synthesized root identifier can reach all DHCP associations stored in the database.

Figure 9:
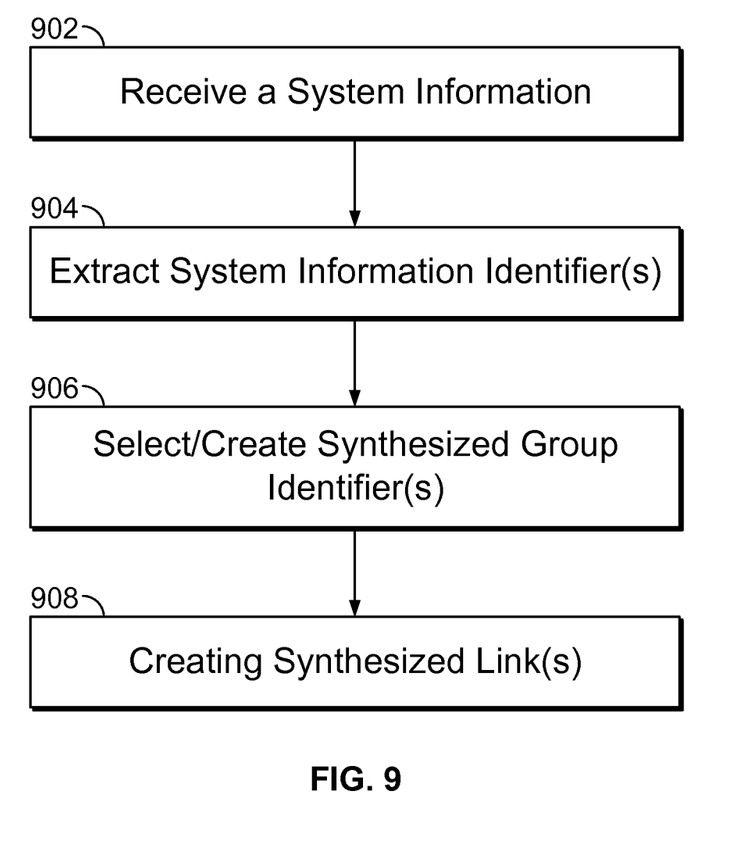
FIG. 9 is a block diagram illustrating a process for linking network information identifier to a synthesized group identifier in a database such as an IF-MAP database.

FIG. 9 is a block diagram illustrating a process for linking network information identifier to a synthesized group identifier in a database such as an IF-MAP database. At 902, a system information is received. The information can be received for example from a IF-MAP database server or from another IF-MAP server. At 904, a system information identifier is extracted from the system information received. The system information identifier may be extracted based on the type of system information received and a set of predefined rules. For example, when a DHCP ipv4 lease is determined to have been received, IP address, MAC address, and/or DHCP server identifier are extracted from the received system information, when a DHCP ivp6 lease is determined to have been received, IP Address, DUID, and/or DHCP server identifier are extracted. At 906, one or more synthesized group identifiers automatically are selected from a plurality of existing synthesized group identifiers or created based on a set of predefined rules and/or based on user instructions. For example, the synthesized IPAddressSpace identifier is selected since an IP address has been received, and the MACAddressSpace identifier is selected since a MAC address has been received. At 908, synthesized links are created or updated, each linking the received network information identifier to a selected or generated synthesized group identifier. The membership of individual synthesized group identifiers may overlap. In other words, a system information identifier may be linked to multiple synthesized group identifiers. Creating the synthesized links may include storing the synthesized group identifiers, synthesized links and/or associated metadata, for example in a relational database supporting the IF-MAP graph representation. Updating the synthesized links are carried out by updating the synthesized group identifiers, synthesized links and/or associated metadata in storage space, such as a relational database supporting the IF-MAP graph representation.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for managing system information in an IF-MAP database, comprising:
a processor configured to:
receive system information for storing in the IF-MAP database, wherein the IF-MAP database is a graph database including a plurality of nodes and a plurality of edges each connecting one node to another node;
create a first synthesized link linking a first system information identifier corresponding to the system information to a synthesized group identifier; and
in response to a search or subscription request based on a second system information identifier, a link between two system information identifiers, or associated metadata, traverse a plurality of synthesized links including the first synthesized link and the synthesized group identifier to reach the first system information identifier;
wherein the first and second system information identifiers and the synthesized group identifier are nodes in the graph database, and wherein each synthesized link corresponds to an edge in the graph database; and
a memory coupled to the processor and configured to provide the processor with instructions.

2. The system recited in claim 1, wherein the processor is further configured to identify the first system information identifier from a plurality of system information identifiers existing in the IF-MAP database; and wherein the first system information identifier is not directly or indirectly linked to the second system information identifier without the first synthesized link.

3. The system recited in claim 1, wherein the processor is further configured to create the first system information identifier, wherein the traversing operation comprises traversing a plurality of paths to reach the first system information identifier, each path including the first synthesized link, the first and second system information identifiers, and the synthesized group identifier.

4. The system recited in claim 1, wherein the processor is further configured to extract the first system information identifier from the received system information.

5. The system recited in claim 1, wherein the processor is further configured to store the first system information identifier and the first synthesized link in the IF-MAP database.

6. The system recited in claim 1, wherein the system information is a DHCP lease received from a DHCP server that includes an IP address and association of the IP address with a device identifier.

7. The system recited in claim 1, wherein the synthesized group identifier is a unique logical identifier that represents a logical group to which the first system information identifier belongs and is linked to all identifiers of the logical group.

8. The system recited in claim 1, wherein the synthesized group identifier is a synthesized root identifier.

9. The system recited in claim 1, wherein the synthesized group identifier is a synthesized root identifier, wherein all network information identifiers of the IF-MAP database are linked to the synthesized root identifier, and wherein the search or subscription request is capable of reaching all network information identifiers of the IF-MAP database.

10. The system recited in claim 1, wherein the synthesized group identifier is a non-root identifier representing a logical group selected from the group consisting of: IP address, MAC address, device, identity, and access request.

11. The system recited in claim 1, wherein the processor is further configured to automatically create the synthesized group identifier based on a predefined rule.

12. The system recited in claim 1, wherein the processor is further configured to automatically create the synthesized group identifier based at least in part on a value of a system information identifier.

13. The system recited in claim 1, wherein the processor is further configured to automatically identify an appropriate synthesized group identifier from a plurality of synthesized group identifiers based on one or more predefined rules.

14. The system recited in claim 1, wherein the processor is further configured to automatically identify an appropriate synthesized group identifier from a plurality of synthesized group identifiers based at least in part on a value of a system information identifier.

15. The system recited in claim 1, wherein the processor is further configured to create the synthesized group identifier based on user instructions.

16. The system recited in claim 1, wherein creating the first synthesized link is automatically performed based on a predefined rule.

17. The system recited in claim 1, wherein the first synthesized link includes a unidirectional link linking a system information identifier to the synthesized group identifier, and wherein the unidirectional link can only be traversed in the direction of synthesized group identifier to the system information identifier.

18. The system recited in claim 1, wherein the first synthesized link includes a bidirectional link linking a system information identifier to the synthesized group identifier, and wherein the bidirectional link can be traversed in both directions.

19. The system recited in claim 1, wherein the synthesized group identifier is a first synthesized group identifier representing a first logical group, and wherein the processor is further configured to create a second synthesized link linking the first system information identifier to a second synthesized group identifier representing a second logical group.

20. The system recited in claim 1, wherein the processor is further configured to receive a search request based on the synthesized group identifier, and in response traverse a synthesized link to produce a search result.

21. The system recited in claim 1, wherein the processor is further configured to receive a subscription request based on the synthesized group identifier, and in response traverse a synthesized link to produce a search result.

22. The system recited in claim 1, wherein the system information is received from a client or a different IF-MAP server.

23. A method of managing system information in an IF-MAP database, comprising:
receiving system information for storing in the IF-MAP database, wherein the IF-MAP database is a graph database including a plurality of nodes and a plurality of edges each connecting one node to another node;

creating a first synthesized link linking a first system information identifier corresponding to the system information to a synthesized group identifier using a processor; and in response to a search or subscription request based on a second system information identifier, a link between two system information identifiers, or associated metadata, traversing a plurality of synthesized links including the first synthesized link and the synthesized group identifier to reach the first system information identifier;

wherein the first and second system information identifiers and the synthesized group identifier are nodes in the graph database, and wherein each synthesized link corresponds to an edge in the graph database.

24. The method as recited in claim 23, further comprising identifying the first system information identifier from a plurality of system information identifiers existing in the IF-MAP database; and wherein the first system information identifier is not directly or indirectly linked to the second system information identifier without the first synthesized link.

25. The method as recited in claim 23, further comprising creating the first system information identifier, wherein the traversing operation comprises traversing a plurality of paths to reach the first system information identifier, each path including the first synthesized link, the first and second system information identifiers, and the synthesized group identifier.

26. The method as recited in claim 23, further comprising extracting the first system information identifier from the received system information.

27. The method as recited in claim 23, further comprising storing the first system information identifier and the first synthesized link in the IF-MAP database.

28. The method as recited in claim 23, wherein the system information is a DHCP lease received from a DHCP server that includes an IP address and association of the IP address with a device identifier.

29. The method as recited in claim 23, wherein the synthesized group identifier is a unique logical identifier that represents a logical group to which the first system information identifier belongs and is linked to all identifiers of the logical group.

30. The method as recited in claim 23, wherein the synthesized group identifier is a synthesized root identifier.

31. The method as recited in claim 23, wherein the synthesized group identifier is a synthesized root identifier, wherein all network information identifiers of the IF-MAP database are linked to the synthesized root identifier, and wherein the search or subscription request is capable of reaching all network information identifiers of the IF-MAP database.

32. The method as recited in claim 23, wherein the synthesized group identifier is a non-root identifier representing a logical group selected from the group consisting of: IP address, MAC address, device, identity, and access request.

33. The method as recited in claim 23, further comprising automatically creating the synthesized group identifier based on a predefined rule.

34. The method as recited in claim 23, further comprising automatically creating the synthesized group identifier based at least in part on a value of a system information identifier.

35. The method as recited in claim 23, further comprising automatically identifying an appropriate synthesized group identifier from a plurality of synthesized group identifiers based on one or more predefined rules.

36. The method as recited in claim 23, further comprising automatically identifying an appropriate synthesized group identifier from a plurality of synthesized group identifiers based at least in part on a value of a system information identifier.

37. The method as recited in claim 23, further comprising creating the synthesized group identifier based on user instructions.

38. The method as recited in claim 23, wherein creating the first synthesized link is automatically performed based on a predefined rule.

39. The method as recited in claim 23, wherein the first synthesized link includes a unidirectional link linking a system information identifier to the synthesized group identifier, and wherein the unidirectional link can only be traversed in the direction of synthesized group identifier to the system information identifier.

40. The method as recited in claim 23, wherein the first synthesized link includes a bidirectional link linking a system information identifier to the synthesized group identifier, and wherein the bidirectional link can be traversed in both directions.

41. The method as recited in claim 23, wherein the synthesized group identifier is a first synthesized group identifier representing a first logical group, and further comprising creating a second synthesized link linking the first system information identifier to a second synthesized group identifier representing a second logical group.

42. The method as recited in claim 23, further comprising receiving a search request based on the synthesized group identifier, and in response traversing a synthesized link to produce a search result.

43. The method as recited in claim 23, further comprising receiving a subscription request based on the synthesized group identifier, and in response traversing a synthesized link to produce a search result.

44. The method as recited in claim 23, wherein the system information is received from a client or a different IF-MAP server.

45. A computer program product for managing system information in an IF-MAP database, the computer program product comprising a non-transitory computer readable storage medium storing computer instructions for:

receiving system information for storing in the IF-MAP database, wherein the IF-MAP database is a graph database including a plurality of nodes and a plurality of edges each connecting one node to another node;

creating a first synthesized link linking a first system information identifier corresponding to the system information to a synthesized group identifier; and in response to a search or subscription request based on a second system information identifier, a link between two system information identifiers, or associated metadata, traversing a plurality of synthesized links including the first synthesized link and the synthesized group identifier to reach the first system information identifier;

wherein the first and second system information identifiers and the synthesized group identifier are nodes in the graph database, and wherein each synthesized link corresponds to an edge in the graph database.

46. The computer program product recited in claim 45, further comprising identifying the first system information identifier from a plurality of system information identifiers existing in the IF-MAP database; and wherein the first system information identifier is not directly or indirectly linked to the second system information identifier without the first synthesized link.

47. The computer program product recited in claim 45, further comprising creating the first system information identifier, wherein the traversing operation comprises traversing a plurality of paths to reach the first system information identifier, each path including the first synthesized link, the first and second system information identifiers, and the synthesized group identifier.

48. The computer program product recited in claim 45, further comprising extracting the first system information identifier from the received system information.

49. The computer program product recited in claim 45, further comprising storing the first system information identifier and the first synthesized link in the IF-MAP database.

50. The computer program product recited in claim 45, wherein the system information is a DHCP lease received from a DHCP server that includes an IP address and association of the IP address with a device identifier.

51. The computer program product recited in claim 45, wherein the synthesized group identifier is a unique logical identifier that represents a logical group to which the first system information identifier belongs and is linked to all identifiers of the logical group.

52. The computer program product recited in claim 45, wherein the synthesized group identifier is a synthesized root identifier.

53. The computer program product recited in claim 45, wherein the synthesized group identifier is a synthesized root identifier, wherein all network information identifiers of the IF-MAP database are linked to the synthesized root identifier, and wherein the search or subscription request is capable of reaching all network information identifiers of the IF-MAP database.

54. The computer program product recited in claim 45, wherein the synthesized group identifier is a non-root identifier representing a logical group selected from the group consisting of: IP address, MAC address, device, identity, and access request.

55. The computer program product recited in claim 45, further comprising automatically creating the synthesized group identifier based on a predefined rule.

56. The computer program product recited in claim 45, further comprising automatically creating the synthesized group identifier based at least in part on a value of a system information identifier.

57. The computer program product recited in claim 45, further comprising identifying an appropriate synthesized group identifier from a plurality of synthesized group identifiers based on one or more predefined rules.

58. The computer program product recited in claim 45, further comprising automatically identifying an appropriate synthesized group identifier from a plurality of synthesized group identifiers based at least in part on a value of a system information identifier.

59. The computer program product recited in claim 45, further comprising creating the synthesized group identifier based on user instructions.

60. The computer program product recited in claim 45, wherein creating the first synthesized link is automatically performed based on a predefined rule.

61. The computer program product recited in claim 45, wherein the first synthesized link includes a unidirectional link linking a system information identifier to the synthesized group identifier, and wherein the unidirectional link can only be traversed in the direction of synthesized group identifier to the system information identifier.

62. The computer program product recited in claim 45, wherein the first synthesized link includes a bidirectional link linking a system information identifier to the synthesized group identifier, and wherein the bidirectional link can be traversed in both directions.

63. The computer program product recited in claim 45, wherein the synthesized group identifier is a first synthesized group identifier representing a first logical group, and further comprising creating a second synthesized link linking the first system information identifier to a second synthesized group identifier representing a second logical group.

64. The computer program product recited in claim 45, further comprising receiving a search request based on the synthesized group identifier, and in response traversing a synthesized link to produce a search result.

65. The computer program product recited in claim 45, further comprising receiving a subscription request based on the synthesized group identifier, and in response traversing a synthesized link to produce a search result.

66. The computer program product recited in claim 45, wherein the system information is received from a client or a different IF-MAP server.

* * * * *